(12) United States Patent
Pabsch et al.

(10) Patent No.: US 6,485,594 B1
(45) Date of Patent: Nov. 26, 2002

(54) METHOD FOR PRODUCING SECTIONS IN SANDWICH STRUCTURES OF FIBER COMPOSITES AND SECTIONS PRODUCED ACCORDINGLY

(75) Inventors: Arno Pabsch, Braunschweig (DE); Wilm Felix Unckenbold, Braunschweig (DE); Axel Herrmann, Peine (DE)

(73) Assignee: Deutsches Zentrum fur Luft und Raumfahrt e.V., Bonn (DE)

( * ) Notice: Subject to any disclaimer, the term of this patent is extended or adjusted under 35 U.S.C. 154(b) by 0 days.

(21) Appl. No.: 09/508,224

(22) PCT Filed: Sep. 8, 1998

(86) PCT No.: PCT/EP98/05680

§ 371 (c)(1),
(2), (4) Date: May 26, 2000

(87) PCT Pub. No.: WO99/12729

PCT Pub. Date: Mar. 18, 1999

(30) Foreign Application Priority Data

Sep. 8, 1997 (DE) .......................... 197 39 291

(51) Int. Cl.⁷ .......................... B32B 3/00; B29D 31/00
(52) U.S. Cl. ................ 156/213; 156/212; 156/256; 428/36.1; 428/72; 428/134; 428/137

(58) Field of Search ................ 156/256, 212, 156/213, 226, 245; 244/129.1, 129.3, 129.5, 125, 126; 428/34.1, 36.1, 36.5, 72, 73, 313.3, 131, 134, 137

(56) References Cited

U.S. PATENT DOCUMENTS

| 2,839,442 A | 6/1958 | Whitaker |
| 3,879,245 A | 4/1975 | Fetherston et al. |
| 3,912,380 A | 10/1975 | Klein |
| 5,365,662 A | 11/1994 | Anderegg |

FOREIGN PATENT DOCUMENTS

| DE | 35 37 402 A1 | 10/1985 |
| DE | 89 01 950.4 | 2/1989 |
| GB | 1145782 | 4/1966 |

*Primary Examiner*—Michael W. Ball
*Assistant Examiner*—Todd J. Kilkenny
(74) *Attorney, Agent, or Firm*—Salter & Michaelson

(57) ABSTRACT

A method for producing sections in sandwich structures of fiber composites is provided, as well as the structures. The method involves shaping sectional cores around a cut-out, applying bands circumferentially along the perimeter of the cut-out, and covering the sectional cores and to circumferential bands, with layers. The sandwich structure is then impregnated with resin.

16 Claims, 4 Drawing Sheets

Figure 1:
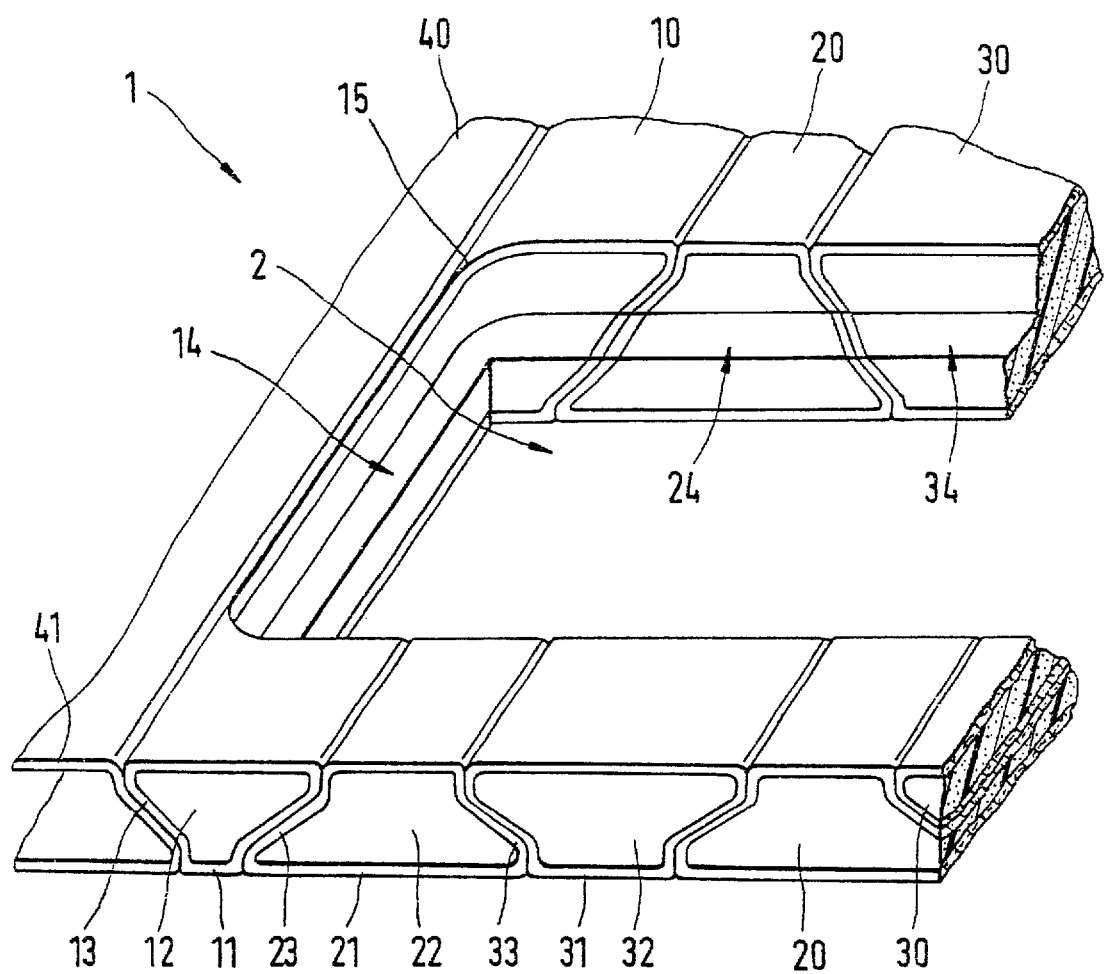

METHOD FOR PRODUCING SECTIONS IN SANDWICH STRUCTURES OF FIBER COMPOSITES AND SECTIONS PRODUCED ACCORDINGLY

The invention concerns a method for making composite fibre sandwich structures with upper and lower outer layer, at least one sectional core, and with a cut-out, in which the sectional core(s) are shaped and/or cut to size in accordance with the cut-out to be produced and the upper and lower outer layer are cut and cut to size in the region of the cut-out in matching fashion. It further concerns a composite fibre sandwich structure with upper and lower outer layer, at least one sectional core, and with a cut-out, in which the sectional core(s) are shaped and/or cut to size in accordance with the cut-out to be produced and the upper and lower outer layer are cut and cut to size in the region of the cut-out in matching fashion.

At the present time, the use of composite fibre structures with a large area is becoming increasingly important in the aircraft, ship and rail vehicle construction sectors.

As a consequence of their high load-bearing capacity combined with a low structural weight, sandwich structures with a sectional core and a composite fibre construction are often suitable for use here. Otherwise aluminium structures are used as an alternative. Thus, U.S. Pat. No. 3,912,380 proposes a sandwich structure for larger reflector mirrors with a honeycomb structure. The honeycomb structure is to consist of aluminium and the top and bottom are each provided with an appropriate coating to receive the mirror. Precisely in the centre of this structure, intended to form a telescope, a hole or through cut-out is provided, this cut-out being achieved by a simple cutting away of parts of the honeycomb structure and the outer layers.

However, door and/or window cut-outs also always have to be made in this walling for aircraft, ships or railway vehicles. As is well known, these are produced by making cut-outs in the solid material. It is very expensive to produce a durable structure notwithstanding, despite weakening the sandwich structure at this point. To implement an integral method of construction here for the cut-outs which is appropriate to composite fibre structures, reinforcing elements must be inserted where necessary, which is associated with the above-mentioned high expenditure as regards design and fabrication technology.

Therefore, the object of the invention is to propose a method of producing composite fibre sandwich structures with outer layers and sectional core and cut-outs and also such composite fibre sandwich structures themselves, by means of which a sandwich structure is feasible, which is appropriate to the stress and the fabrication method, with cut-outs for windows and doors for example.

The object is achieved in a method as described above in that the the upper and/or lower outer layer are so cut and cut to size, that cut-to-size components remain which initially partly cover the region of the cut-out, strips are laid or draped around the perimeter of the cut-out contour, the cut-to-size components of the upper and lower outer layer are wrapped around the shaped or cut-to-size sectional cores and the strips around the perimeter, appropriate to the composite fibre and the sandwich structure is soaked with resin and cured.

The object is achieved in a composite fibre sandwich structure as described above in that strips are provided which surround the cut-out and are applied to the walls of the sectional cores and in that the lower outer layer and/or the upper outer layer are shaped and/or cut in oversize manner in the area of the cut-out and project into the cut-out and cover the surrounding strips. Further embodiments of the invention are defined in the respective sub-claims.

The problem is solved by a method according to the generic part of claim 1 in that the sectional cores are shaped and/or cut to size as required for the cut-out to be produced, the upper and lower outer layers are cut through and cut to size appropriately in the area of the cut-out, strips are inserted or draped around the perimeter of the contour of the cut-out, the cut-to-size components of the upper and lower layer surround the sectional cores which have been shaped or cut to size and the surrounding strips suitable to the composite fibre construction and the sandwich structure is soaked with resin and cured. The problem is also solved by a composite fibre sandwich structure with upper and lower outer layer, at least one sectional core, and with a cut-out, in which the section cores are shaped and/or cut to size in accordance with the cut-out to be produced and the upper and lower outer layer are adjusted in the area of the cut-out by being cut and cut to size, which is characterised in that strips are provided which surround the cut-out and are applied to the walls of the sectional cores and in that the lower outer layer and/or the upper outer layer are shaped and/or cut in oversize manner in the area of the cut-out and project into the cut-out and cover the surrounding strips.

It is particularly preferable to integrate a frame into the design of the structure direct by using the shaping of the sectional cores, into which a window pane, for example, can be inserted direct and attached with adhesive. Consequently no further design measures are necessary for attaching a window pane of this type in the cut-out.

As a consequence of the advantageous layers of woven or non-woven material comprising the upper and lower outer surfaces, adjusted to the respective loadings occurring in the form of forces applied to the sandwich structure, and the shear elements within the sandwich structure, also in the area of the cut-out, no significant warping arises there. Therefore, a window pane inserted in this cut-out can be held almost without loading from forces acting within the sandwich structure.

Strips made of woven or non-woven fibre materials with a unidirectional orientation, placed in position in the area of the walls of the cut-out or shaped sectional cores, are given particular preference. In this case the strips are laid so that they run round the cut-out in an arrangement which is perpendicular to the outer layers. This transfers any forces in the direction around the cut-out, i.e. remaining in its plane. As a consequence of the advantageous and preferred positioning of the respective outer layers on the outside of these strips of material with a unidirectional orientation, the positive characteristics of the orientation of the fibres in the top and bottom layers can also be utilised in the area of the cut-out. Warping in the area of the support surface of a window pane with the preferred stepping as the shaping of the sectional cores surrounding the cut-out is also restricted advantageously to a very low level in the form of the two outer layers, laid one over the other, thus a double woven or non-woven layer.

The sectional cores are preferably each cut to size in steps in the area of the cut-out in such a way that a support surface is produced for elements to be inserted in the cut-out, such as, for example, window or door elements etc. Here the sectional cores should preferably either be removable silicone cores sheathed with a woven or non-woven fibre material, cut from non-removable, so-called lost foam cores, or pre-shaped as woven hoses in correspondingly pre-shaped master moulds and placed on the lower outer layer as pre-shaped hollow components.

It is particularly preferable to place the sectional cores on the lower outer layer made of woven or non-woven fibre material with an application-specific orientation, then to cut through or cut out the lower outer layer, especially diagonally for a rectangular cut-out, then to place the upper outer layer on the sectional cores and cut through it or cut it out and then wrap the cut areas of the outer layers round appropriately.

It is particularly preferable if the outer layers along the diagonals of the cut-out are cut through and the triangular elements or laps produced in this way are cut to size again in such a way that the area of their respective tips is cut off parallel to the edges of the cut-out with a defined overlap in respect of these edges. This then produces trapezoidal cut-to-size components, which are then laid along the steps of the pre-shaped sectional cores. In this case it is advantageous for the oversizing of the cut-to-size components to be selected in such a way that the outer layers are shaped so that they overlap each other in the support area for the elements to be inserted and are shaped so that they are in contact with the walls of the sectional cores delineating the respective cut-out.

Preferably, after the sandwich structure has been cured, the cores of the sectional cores should be removed from the finished moulded component. However, as an alternative to the latter they can also remain in the structure, for example as foam cores, which can no longer be removed from the cured woven or non-woven layers of the composite fibre material.

It is particularly advantageous for the cut-out to be used as the window or door cut-out in the walling of a railway vehicle or aircraft. In this case the prefabricated window panes are simply inserted and attached with adhesive. No further processing is necessary.

Producing the sheathing surface for the sectional cores determines the size when tailoring the fibre material for components to be cut to size, which will surround the sectional cores in the area of the cut-out. The small sections of the woven layers of the outer layers, which are missing in the corners because of the diagonal cut and subsequent draping on the prefabricated sectional cores, are replaced in the area of the strips inserted perpendicular to the outer layers by the strips as the vertical walling of the cut-out or sectional core in this area. In the area of the supporting surface parallel to the outer layers, in which the two individual layers of the outer layers lie on top of each other, there is also no disadvantage from the missing material in the corners, in a small area in each case, as a consequence of the diagonal cut or subsequent trapezoidal shaping of the cut-to-size pieces of the outer layers. Nevertheless, a good and stable support surface for a window pane, for example, is provided within the cut-out.

The sectional cores are particularly preferable in the form of so-called lost foam cores, if a high thermal and/or sound insulation is required from the sandwich structure. Sound insulation of this type can also be achieved by selecting an appropriate orientation for the fibres in the outer layers. A fibre orientation of ±30° has proved particularly effective here. The upper and the lower outer layers may consist of different fibre layers, each of which may demonstrate different orientations in their fibres. This enables different advantageous configurations to absorb the forces acting on the sandwich structure simultaneously which therefore no longer have a negative effect on the sandwich structure as such.

Figure 2:
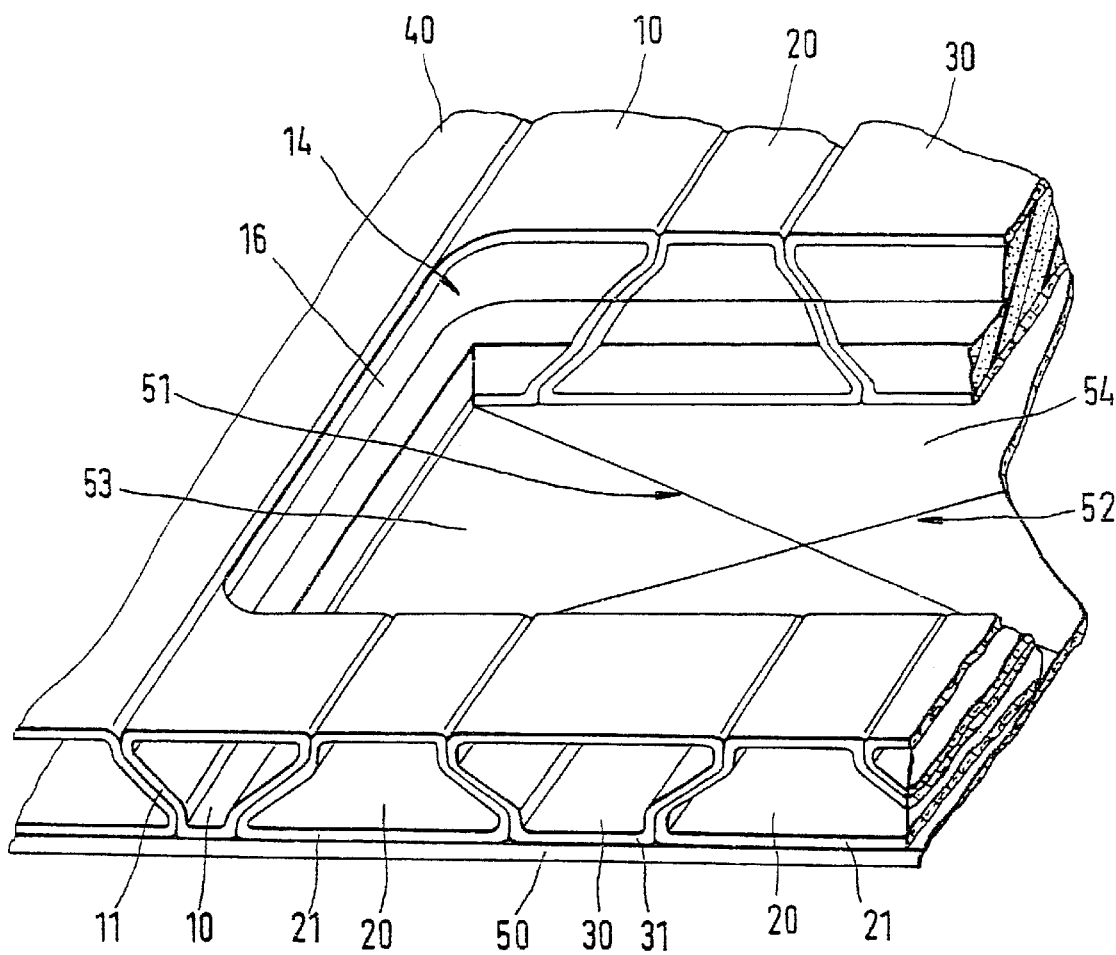

To provide a more detailed explanation of the invention, embodiments are described below using drawings. These show:

FIG. 1: A perspective view of sectional cores designed in accordance with the invention, bordering a cut-out, FIG. 2: A perspective view of the sectional cores in accordance with FIG. 1 being joined on to a lower outer layer, FIG. 3: A perspective view of the sectional cores with upper and lower outer layer, FIG. 4: A perspective view of a completed sandwich structure with cut-out in accordance with the invention and FIG. 5: A detailed section view through the cut-out in accordance with FIG. 4 with the window pane inserted in it.

FIG. 1 shows a perspective view of a sandwich structure 1 with a cut-out 2 already partially prefabricated. The sandwich structure is also only shown in the form of a detailed cut-out of the actual heart of a structure of this type, namely the sectional cores. The sectional cores are designed in such a way in respect of each other that together they form the cut-out 2. Firstly, continuous sectional cores can be divided up for this purpose. Alternatively, however, individual pieces of such sectional cores can be joined together, thus producing the cut-out 2.

To form the sandwich structure 1, first of all several sectional cores are arranged side by side, each turned by 180°. In this way the respective woven or non-woven fibre material sheath of two adjacent sectional cores is adjacent the next in the area of the respective shear elements. The cut-out 2 is then removed from this structure. If, for example, a window pane is to be inserted subsequently in this cut-out, a step, 14, 24, 34, is preferably provided in the wall area of the cut-out. A step of this kind is cut out from each of the sectional cores.

The sectional core 10 in accordance with FIG. 1 shows a core 12 which is sheathed by a woven or non-woven fibre material 11. This core 12 may preferably be a foam core. A core of this kind cannot be removed from the woven fibre after the entire sandwich structure has been completed. It remains in the latter as a so-called lost foam core. The sectional core 20 is arranged alongside this sectional core 10. It also has a woven or non-woven fibre material 21 which sheaths a core 22. This is preferably a silicone core, which can be removed after completion of the sandwich structure, i.e. can be removed completely from the sectional core 20 and reused. Then only the woven or non-woven fibre material sheath 21 remains in the structure. A sectional core 30 is arranged alongside this sectional core 20 but with a reversed arrangement. This is also preferably provided with a silicone core 32 sheathed by a woven or non-woven fibre material 31. The silicone core 32 is also preferably removable.

Further sectional cores 20 and 30 can be arranged alongside the sectional core 30 in alternating sequence in each case. These are only partially illustrated in FIG. 1.

The sectional core 10 is also adjacent to a sectional core 40 on its side pointing away from the sectional core 20. This is shown with the silicone core already removed. Therefore only the woven or non-woven fibre sheath 41 is visible. The sectional core 40 does not form part of the cut-out. Therefore it forms a firm contact for the sectional core 10 which has a cut-out along a large part of its length.

The core 12 of the sectional core 10 has a step 14. The respective corners of the cut-out 2 are specially shaped in this area, namely as rounded corners 15. The step 14 is also formed within the shear element 13 of the sectional core 10. The adjacent sectional core 20 is also provided with a step 24, continuing the step 14 of the sectional core 10. The shear elements 23 of the sectional core 20 are also included in the step.

The adjacent sectional core 30 is also provided with a corresponding step 34. This step too extends across the entire core 32 and the sheathing woven or non-woven fibre material 31 of the sectional core 30 and across the shear elements 33. The sectional core 20 arranged next to the sectional core 30 is shaped in the same way as the other sectional core 20. The same applies to the further sectional core 30 which is arranged adjacent to this sectional core 20.

Instead of cores made of silicone or foam material, the sectional cores may also be formed from fabric hoses which can be blown up. These are inserted in a master mould to produce the relevant shape and are cured in this condition after being soaked with resin. Sectional cores of this type, made from woven hoses, as shown in the front area of FIG. 2, can then be arranged adjacent to each other and can also form a boundary for the cut-out 2. To form a supporting surface for a window pane or similar item to be inserted subsequently, an additional foam core can be inserted in these prefabricated sectional cores, made of fabric hoses, in the area of the cut-out, as is shown in the rear part of the cut-out 2 in FIG. 2. Alternatively, however, the woven hoses can already be pre-formed with a step in the master moulds.

Unlike FIG. 1, the sectional core 10 has a correspondingly divided core 12 in this embodiment. A long part component 16 is manufactured separately in this case. This can make shaping easier and can also create additional possible variations.

To manufacture a complete sandwich structure, the sectional cores arranged side by side are joined to a lower outer layer 50, consisting of a woven or non-woven fibre material. The lower outer layer is preferably provided with diagonal cuts 51, 52 in the area of the cut-out 2. This produces triangular pieces 53, 54 which are each shaped alternately as mirror images.

Figure 3:
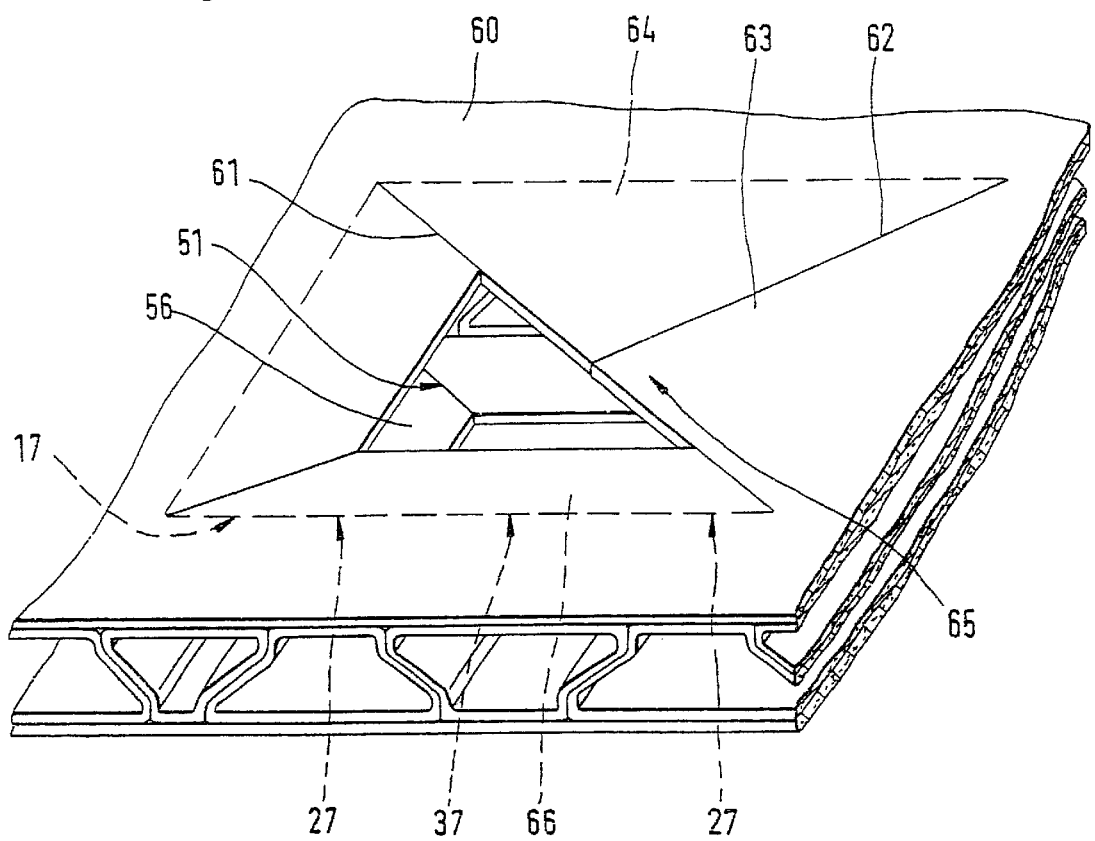

FIG. 3 shows a perspective view of a further stage of fabrication of the sandwich structure with cut-out. In this case an upper outer layer 60 is now joined to the sectional cores. First of all diagonal cuts 61, 62 are made in the latter. Once again this produces alternate identical triangular pieces 63, 64.

In order to produce clean walling for the cut-out 2, the front tips 65 of the triangular pieces 63, 64 are cut off parallel to the upper lines 17, 27, 37, shown as dashes, of the sectional cores 10, 20, 30. This produces the completed trapezoidal cut-to size components 66 with a corresponding defined amount of oversizing.

Cut to size components 56 with dimensions corresponding to those in the upper outer layer are preferably formed in the lower outer layer 50. These are partly visible in FIG. 3.

Figure 4:
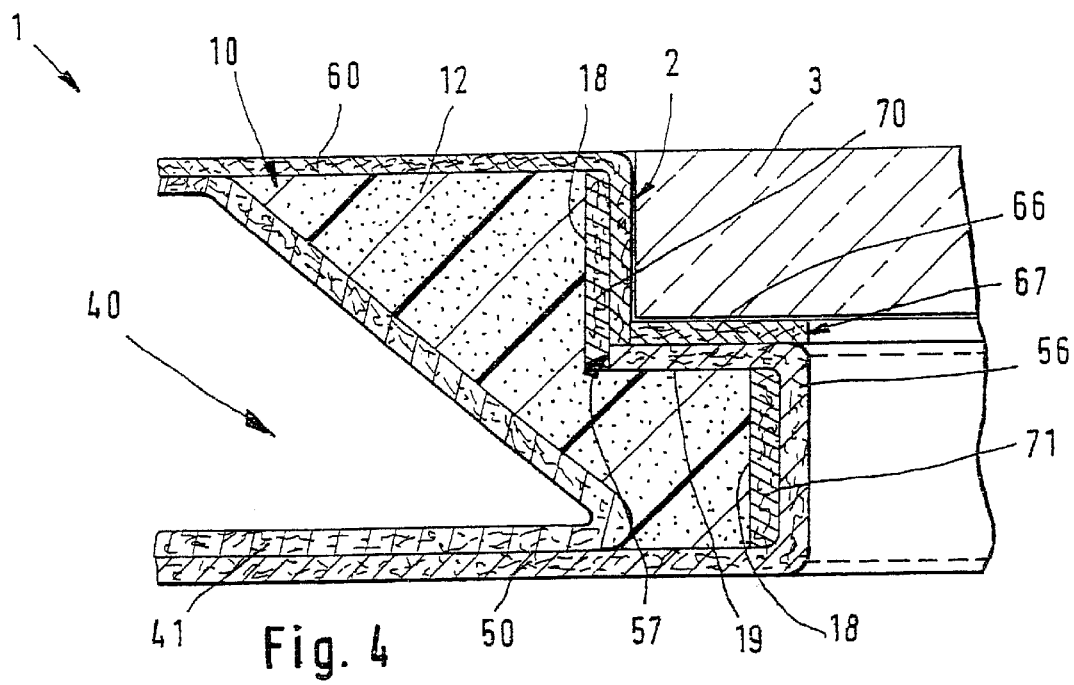

FIG. 4 shows a sectional view through the edge area of the cut-out 2 in the sandwich structure 1 when completed. A window pane 3 is already inserted in the cut-out in this case. This is preferably attached with adhesive in the cut-out 2.

After cutting to size to form the tailored components 56, 66 of the upper and lower outer layers 50, 60, these cut to size components are bent appropriately and laid against the walls of the sectional core surrounding the cut-out 2. However, before completion of the cut-out, first of all a strip 70, especially a woven strip with a unidirectional fibre orientation, is arranged on the walling 18 of the sectional core 10 perpendicular to the upper outer layer 60. This strip serves to reinforce the cut-out. It is inserted around the perimeter along the cut-out so that the fibre orientation of the woven or non-woven material causes unidirectional transference of the forces around the cut-out.

The lower walling 18 of the sectional core 10, which is arranged perpendicular to the lower outer layer 50, is also fitted with a corresponding strip 71, especially also a woven band with unidirectional orientation of the fibres.

The cut-to-size components 56 and 66 are then wrapped over the woven strips 70, 71, thus sheathing them from outside. Then, first of all the cut-to-size component 56 is placed on the horizontal walling 19 of the sectional core 10. The cut to size component 56 is then in contact with the woven strip 70 with its front edge 57.

The sectional core 40 present in FIG. 4 next to the sectional core 10 with lost foam core 12, only shows its woven or non-woven fibre sheath 41. This can either be a woven hose which is pre-shaped in a master mould or a sectional core 40 which has already had the core removed.

Before attaching the window pane 3 in the cut-out 2 of the sandwich structure 1, the latter is soaked with resin and cured. Only after curing, are the removable silicone cores taken out of the sandwich structure. Then the window pane 3 can be inserted in the cut-out 2 and permanently attached to it with adhesive.

Figure 5:
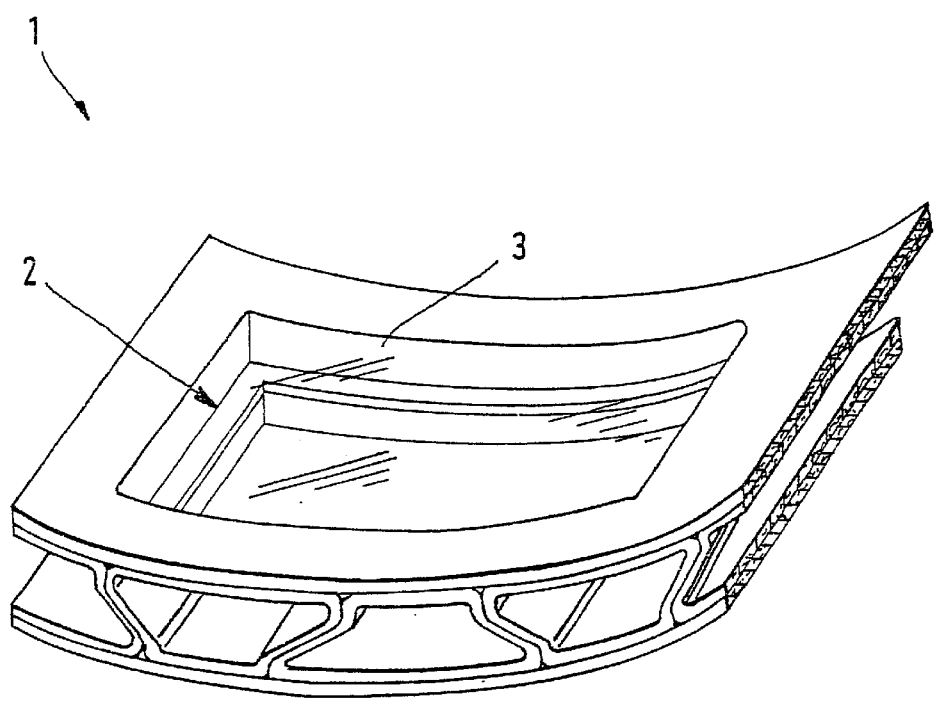

FIG. 5 shows a perspective view of a curved sandwich structure with the window pane 3 inserted. This can, for example, be part of the external walling of a railway vehicle or an aircraft. As a consequence of its lightweight design with the aid of the sandwich structure, the weight of a component of this type is reduced considerably in comparison with that of the known wall components made of aluminium. Moreover, the visual appearance of the sandwich structure is considerably improved in the area of the cut-out 2.

The fibres which are used for the woven or non-woven material in the sandwich structure may consist e.g. of CRP or GRP, i.e. carbon fibre or glass fibre reinforced plastic. The individual woven or non-woven materials demonstrate appropriate orientation of their fibres for the particular application. The shear bridges within the structure have +/−45° fibre orientation in this process.

LIST OF REFERENCE NUMBERS

1 Sandwich structure
2 Cut-out
3 Window pane
10 Sectional core
11 Sheathing woven fibre
12 Core (foam/silicone)
13 Shear element
14 Step
15 rounded corner
16 Long component
17 Edge
18 Walling (perpendicular)
19 Walling (horizontal)
20 Sectional core
21 Sheathing woven fibre
22 Core
23 Shear element
24 Step
27 Edge
30 Sectional core
31 Sheathing woven fibre
32 Core
33 Shear element
34 Step
37 Edge
40 Sectional core
41 Sheathing woven fibre
50 Lower outer layer
51 Cut 52 Cut
53 Triangular pieces
54 Triangular pieces
56 Cut-to-size component
57 Front edge
60 Upper outer layer
61 Cut
62 Cut
63 Triangular pieces
64 Triangular pieces
66 Cut-to-size component
67 Front edge
70 Woven strip
71 Woven strip

What is claimed is:

1. A method for producing composite fiber sandwich structures with an upper outer layer and a lower outer layer, at least one sectional core having a sheathing wall surrounding a core, and with a cut-out in which the at least one sectional core(s) is selectively shaped and/or cut to size and the upper and lower outer layers are adjusted in the area of the cut-out by being cut to size, the method comprising the steps of:

cutting to size the upper and lower outer layers, such that cut-to-size components remain which initially partly cover the region of the cut-out, laying or draping selected strips around the perimeter of the cut-out contour, wrapping the cut-to-size components of the upper and lower outer layers around the sectional cores and the strips around the perimeter, and soaking the sandwich structure with resin, and curing the sandwich structure soaked with resin.

2. The method of claim 1, wherein after the sandwich structure has been cured, the cores are removed from the sheathing wall of the sectional core.

3. The method of claim 1, wherein after the sandwich structure has been cured, the cores remain in the sheathing wall of the sectional cores of the structure.

4. The method of claim 1, further comprising forming the sectional cores with a step that provides a support surface for elements to be inserted in the cut-out.

5. The method of claim 1, wherein the outer layers are cut through diagonally to produce triangular elements and the tip areas of each triangular element are cut off spaced apart from and parallel to the edges of the cut-out.

6. The method of claim 5, wherein the outer layers overlap each other in one area and are in contact with the sheathing walls of the sectional cores which border the cut-out or the inserted strips.

7. The method of claim 1, wherein the sectional cores are selected from the group consisting of removable silicone cores, sheathed by a woven or non-woven fiber material, woven hoses with non-removable lost foam cores, and combinations thereof.

8. The method of claim 1, wherein the strips are formed from a woven or non-woven fiber material with a unidirectional orientation and are applied to the sectional cores, perpendicular to the outer layers, with the unidirectional orientation running round the perimeter.

9. The method of claim 1, further comprising the steps of:

joining the sectional cores to the lower outer layer, wherein the lower outer layer consists of woven or non-woven fiber materials with a selected orientation, cutting the lower outer layer, placing the upper outer layer on the sectional cores, and wrapping the cut-to-size components of the outer layers around the sectional cores.

10. A composite fiber sandwich structure with an upper and lower outer layer, at least one sectional core, and with a cut-out, in which the at least one sectional core is selectively shaped and/or cut to size, and the upper and lower outer layer are adjusted in the area of the cut-out by being cut to size, the composite fiber sandwich structure comprising:

strips provided on the perimeter of the cut-out and in contact with the at least one sectional core; and selectively shaped portions of the lower outer layer and the upper outer layer projecting into the cut-out and covering the strips surrounding the perimeter of the cut-out.

11. The composite fiber sandwich structure of claim 10, wherein the strips are woven or non-woven fiber materials with a unidirectional orientation.

12. The composite fiber sandwich structure of claim 11, wherein the sectional cores are selected from the group consisting of removable silicone cores sheathed by a woven or non-woven fiber material, extrudable woven hoses with non-removable foam cores, and combinations thereof.

13. The composite fiber sandwich structure of claim 12, wherein double layers of woven or non-woven material are provided in the area of the cut-out so perpendicular to the plane of the respective outer layer the strips with unidirectional orientation and the outer layer lie over one other outside the cut-out in the region of the cut-out, and parallel to the plane of the outer layers, a support surface and one of the two outer layers lie over one another outside the cut-out in the region of the cut-out.

14. The composite fiber sandwich structure of claim 13, wherein the cut-out is rectangular.

15. The composite fiber sandwich structure of claim 14, further comprising inserting a window pane cut-out and adhesively attaching the window pane in the cut-out.

16. The composite fiber sandwich structure of claim 14, further comprising inserting a door into the cut-out and adhesively attaching the door in the cut-out.

* * * * *